(12) United States Patent
Gustavsson et al.

(10) Patent No.: US 7,072,649 B2
(45) Date of Patent: Jul. 4, 2006

(54) MULTIPLE PURPOSE ANTENNA SYSTEM

(75) Inventors: Tommy Gustavsson, Greensboro, NC (US); Michael Blackard, Madison, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 508 days.

(21) Appl. No.: 10/263,123

(22) Filed: Oct. 2, 2002

(65) Prior Publication Data

US 2003/0087608 A1 May 8, 2003

Related U.S. Application Data

(60) Provisional application No. 60/332,933, filed on Nov. 6, 2001.

(51) Int. Cl.
*H04Q 7/20* (2006.01)

(52) U.S. Cl. .................. 455/426.1; 455/427; 455/11.1; 455/13.1; 455/13.3; 455/83; 455/3.02; 455/575.7; 455/266; 455/189.1; 455/314; 342/357.12; 342/357.06; 342/357.1; 343/895; 343/702; 343/725

(58) Field of Classification Search .............. 455/11.1, 455/25, 13.1, 13.3, 266, 189.1, 314, 575.7, 455/569.2, 12.1, 3.02, 83, 131, 426.1; 342/357.12, 342/357.06, 357.1
See application file for complete search history.

(56) References Cited

U.S. PATENT DOCUMENTS

| | | | |
|---|---|---|---|
| 4,030,100 A | 6/1977 | Perrotti | |
| 4,117,488 A | 9/1978 | Perrotti | |
| 5,148,183 A | 9/1992 | Aldama | |
| 5,345,247 A | 9/1994 | Aldama et al. | |
| 5,485,485 A * | 1/1996 | Briskman et al. ........... | 375/130 |
| 5,579,014 A * | 11/1996 | Brooksby et al. ....... | 342/357.12 |
| 5,610,620 A | 3/1997 | Stites et al. | |
| 5,650,792 A | 7/1997 | Moore et al. | |
| 5,654,774 A * | 8/1997 | Pugel et al. ................... | 725/70 |
| 5,691,726 A * | 11/1997 | Nichols et al. .......... | 342/357.1 |
| 5,706,015 A | 1/1998 | Chen et al. | |
| 5,719,587 A * | 2/1998 | Rodal ......................... | 343/791 |
| 5,734,352 A | 3/1998 | Seward et al. | |
| 5,805,108 A * | 9/1998 | Lennen ................... | 342/357.12 |
| 5,859,618 A | 1/1999 | Miller, II et al. | |
| 5,859,879 A * | 1/1999 | Bolgiano et al. ........... | 370/330 |
| 5,898,900 A * | 4/1999 | Richter et al. ................ | 725/70 |
| 5,953,644 A * | 9/1999 | Kool et al. ................. | 455/328 |
| 5,963,170 A | 10/1999 | Garner et al. | |
| 6,023,245 A | 2/2000 | Gomez et al. | |
| 6,031,499 A | 2/2000 | Dichter | |
| 6,384,696 B1 * | 5/2002 | Miller et al. ................ | 333/132 |
| 6,600,774 B1 * | 7/2003 | Otto ........................... | 375/139 |

* cited by examiner

*Primary Examiner*—Marceau Milord
(74) *Attorney, Agent, or Firm*—Martin Farrell

(57) ABSTRACT

A multiple purpose antenna system for installation on a highway truck to receive and transmit signals. The system includes an antenna for communication of electromagnetic frequency signals having multiple band widths, a multiplex unit coupled to the antenna having circuitry for simultaneously passing multiple signals of band widths, and a filter unit. The filter is coupled to the multiplex unit for filtering signals received from the multiplex unit into multiple sets of band width ranges. The sets include a first frequency range for use by a first receiver apparatus, a second frequency range for use by a second receiver apparatus, and a third frequency range for use by a third receiver apparatus. The filter unit may be included within a satellite electronic communications unit. The first receiver apparatus may be a weather band radio apparatus. The third receiver apparatus may be an AM/FM commercial radio.

20 Claims, 1 Drawing Sheet

MULTIPLE PURPOSE ANTENNA SYSTEM

CROSS-REFERENCE TO RELATED APPLICATION

This non-provisional patent application claims benefit of U.S. Provisional Patent Application Ser. No. 60/332,933, entitled "Integrated CB/Satellite Communications System" and filed on Nov. 6, 2001.

FIELD OF THE INVENTION

The invention is directed to a communication system, and more particularly, is directed to a multiple purpose antenna system that receives and transmits various types of frequency signals having multiple band widths.

BACKGROUND OF THE INVENTION

Satellite communication devices are gaining increased use in many application areas. Such devices are now being used in over-the-highway truck fleets to allow greater communication between the truck driver and a fleet base operator. The devices generally allow data related to the truck performance and characteristics to be communicated on demand, or at automatically timed periodic intervals.

A highway truck requires an antenna to receive and to send various types of electromagnetic frequency signal. Conventionally, a truck may use a first antenna to receive and to send satellite signals, and a separate second antenna to receive commercial radio or CB signals. Alternatively, if a common antenna is used, an additional filter box is required to filter out the frequency band required by the satellite communication system. The dramatic increase in the number of communication devices used by a highway truck operator has increased the complexity of these types of systems. In today's application environment, a single truck may receive numerous signals at any one time, e.g., commercial AM/FM radio, satellite, CB radio, weather, GPS or cell phone.

The frequency of these various signal types varies. Commercial AM radio bands have a comparatively low frequency range of 550 to 1600 kHz. Commercial FM radio operates in the 88 to 108 MHz range. Citizen Band radio frequencies are in the relatively narrow range of 26.95 to 27.405 MHz. Cellular telephone operates in the relatively high frequency band of 825 to 890 MHz. Weather band signals have frequencies ranging from about 150 MHz to about 170 MHz. Satellite communication signals may have frequencies ranging from about 130 MHz to about 150 MHz. Because of the wide range of frequencies discussed, at least one separate, external filter box is normally utilized to discern the frequency used for satellite communications distinguishing it from other frequencies. Further, additional hardware, connectors, and cabling is required for each extra filter unit installed.

One object of the present invention is the elimination of conventional hardware. The elimination of any part in a standard truck bill of material is significant in not only the cost of the truck, but also in the operation of an over the highway truck fleet. Whenever a part is removed from the bill of material of a truck, the overall weight of the truck reduces. A relatively small reduction in the overall weight of a truck can translate to a material annual fuel savings for a fleet operator.

A need in the market exists for a reliable and relatively inexpensive apparatus and method to accurately receive and send satellite communication signals without increasing truck bill of material complexity, assembly time, or overall system costs.

SUMMARY OF THE INVENTION

The present invention is directed to a system utilizing existing antennae for satellite communications purposes. A separate, external filter box is normally utilized to discern the frequency used for satellite communications to distinguish it from other frequencies. The invention integrates the filtering device with the satellite communication system. Therefore, a separate piece of hardware is eliminated as well as the necessary parts required.

A multiple purpose antenna system for installation on a highway truck to receive and transmit signals. The system includes at least one antenna, a multiplex unit, and a filter unit. The at least one antenna is used for mobile communication of electromagnetic frequency signals having multiple band widths. The multiplex unit is coupled to the at least one antenna and has circuitry for simultaneously passing multiple signals of band widths below an upper limit. The filter unit is coupled to the multiplex unit for filtering signals received from the multiplex unit into multiple sets of band width ranges. The sets include a first frequency range for use by a first receiver apparatus, a second frequency range for use by a second receiver apparatus, and a third frequency range for use by a third receiver apparatus.

In the preferred embodiment, the filter unit is included within a satellite electronic communications unit. The satellite electronic communications unit is used by a driver for transmitting and receiving messages to a satellite and from a satellite. The upper limit of frequency signals passed by the multiplex unit may be about 170 MHz. The filter unit may be a notch filter for filtering out signals having a frequency above a notch range and filtering out signals having a frequency below a notch range. The notch range may be a frequency range from about 130 MHz to about 150 MHz.

In the preferred embodiment, the second receiver apparatus is a satellite electronics communications apparatus, wherein the satellite electronic communications unit is used by a driver for transmitting and receiving messages to a satellite and from a satellite. The second frequency range may include a frequency range used for satellite communication signals having a range from about 130 MHz to about 150 MHz.

In the preferred embodiment, the first frequency range is from about 150 MHz to about 170 MHz. The first frequency range may include a frequency range used for weather band radio signals having a range from about 150 MHz to about 170 MHz. The first receiver apparatus may be a weather band radio apparatus.

In the preferred embodiment, the third frequency range is from about 0 MHz to about 130 MHz. The third frequency range may include a frequency range used for broadcast AM radio signals having a range from about 550 kHz to about 1600 kHz. The third frequency range may include a frequency range used for broadcast FM radio signals having a range from about 88 MHz to about 108 MHz.

The third receiver apparatus may be an AM/FM commercial radio apparatus. The third receiver apparatus may be a Citizens Band radio apparatus used by a driver for transmitting and receiving audio messages to and from another CB radio.

In an alternative embodiment, the multiplex unit includes circuitry for passing signals of a band width above the upper limit to a fourth receiver apparatus. The fourth receiver apparatus may be a cellular telephone used by a driver for transmitting and receiving audio messages to and from another telephone. The signals of a band width above the upper limit may include signals in a frequency band of about 825 MHz to about 890 MHz.

DETAILED DESCRIPTION OF THE PREFERRED EMBODIMENT

Figure 1:
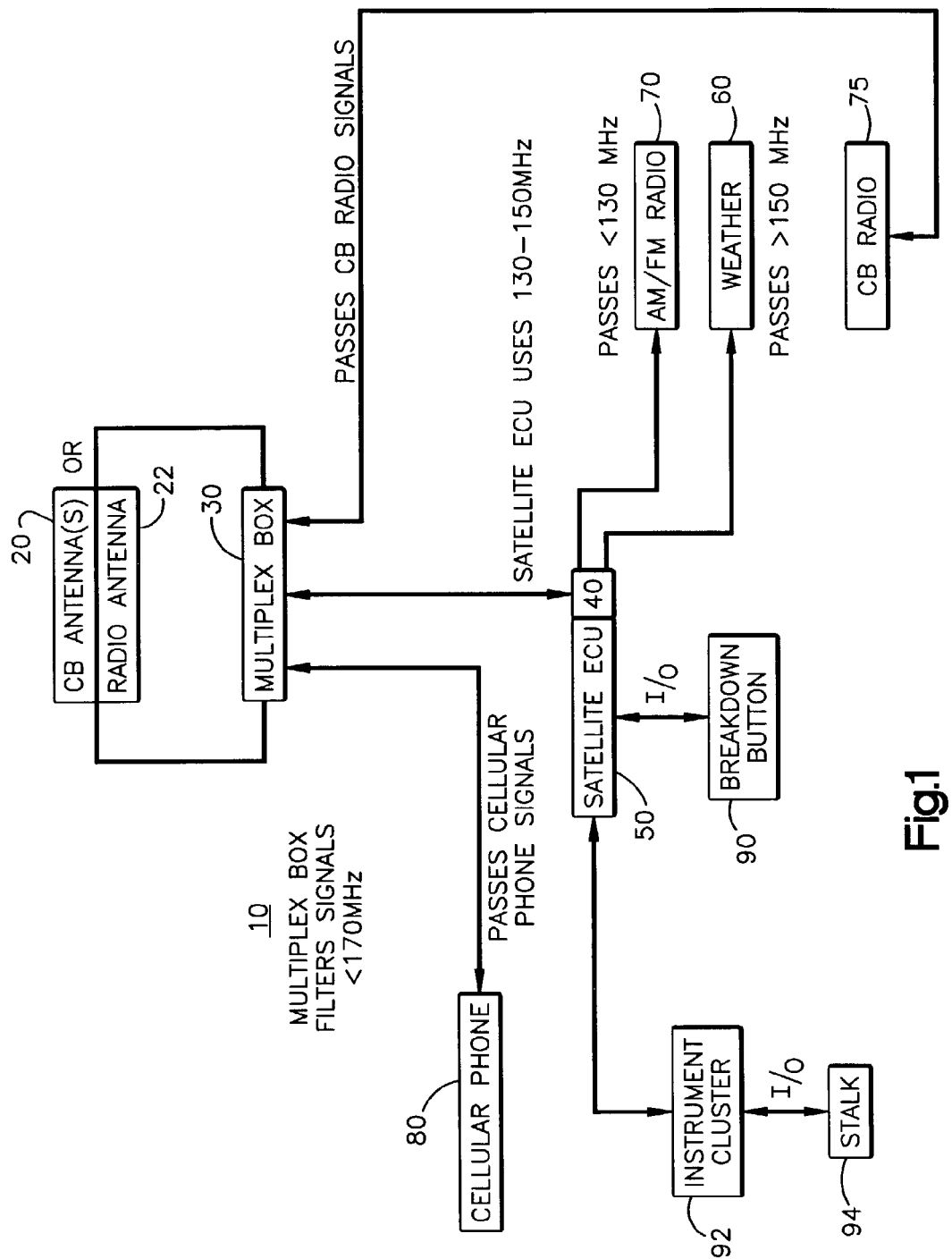
FIG. 1 is a schematic representation of one embodiment of the present invention, showing a multiple purpose antenna system in use with an integrated communications system

Referring now to the drawings, FIG. 1 is a schematic representation of one embodiment of the present invention. The schematic includes details regarding the path of signal processing. A multiple purpose antenna system 10 is shown in use with an integrated communications system. A more detailed discussion of an integrated communications systems can be found in U.S. Provisional Patent Application Ser. No. 60/332,865, entitled "Integrated Vehicle Communications Display," which is incorporated herein by reference in its entirety.

The multiple purpose antenna system 10 illustrated is designed for installation on a highway truck to receive and transmit signals. The system includes at least one antenna, a multiplex unit coupled to the antenna, and a filter unit coupled to the multiplex unit for filtering signals.

As illustrated, the system 10 includes at least one antenna 20, 22 for mobile communication of electromagnetic frequency signals having multiple band widths. In one embodiment of the present invention, various signal types are received by an antenna. The antenna may be of any suitable type. The antenna may be a known Citizen Band radio antenna 20. Alternatively, a commercial radio antenna 22 may be used. In one embodiment, signals are received from both antennae 20, 22.

A multiplex unit 30 is coupled to at least one antenna. The multiplex unit 30 includes circuitry for simultaneously passing multiple signals of band widths below an upper limit. As illustrated, the multiplex unit 30 passes signals of band widths below an upper limit of about 170 MHz.

A filter unit 40 is coupled to the multiplex unit 30. The filter unit 40 filters signals received from the multiplex unit into multiple sets of band width ranges. In the exemplary embodiment, the sets include a first frequency range for use by a first receiver apparatus, a second frequency range for use by a second receiver apparatus, and a third frequency range for use by one or more third receiver apparatus. As illustrated, the filter unit 40 is included within a satellite electronic communications unit 50. The satellite electronic communications unit 50 is used by a driver for transmitting and receiving messages to a satellite and from a satellite.

In an exemplary embodiment, the filter unit 40 is a notch filter. A notch filter 40 operates to filter out signals having a frequency above a notch range and filtering out signals having a frequency below a notch range. The illustrated system 10 includes a notch filter having a notch range from about 130 MHz to about 150 MHz. It should be apparent to others skilled in the art that other notch ranges may be utilized in the practice of the present invention.

As discussed, the filter unit 40 filters signals received from the multiplex unit 30 into three sets of band width ranges. In the embodiment illustrated in FIG. 1, the first frequency range is from about 150 MHz to about 170 MHz. The first frequency range includes a frequency range conventionally used for weather band radio signals. As illustrated, signals in the first frequency range are passed to a first receiver apparatus 60. The first receiver apparatus is illustrated as a weather band radio 60.

The second frequency range is shown from about 130 MHz to about 150 MHz. The second frequency range includes a frequency range conventionally used for satellite communication signal. Signals in the range of about 130 MHz to about 150 MHz are typically the range used for some commercial satellite systems, including systems used in over-the-highway truck fleets. In the embodiment illustrated in FIG. 1, the second receiver apparatus is a satellite electronics communications unit 50. The satellite electronic communications unit 50 may be used by a driver for transmitting and receiving messages to a satellite and from a satellite.

In the exemplary embodiment illustrated in FIG. 1, the multiple purpose antenna system 10 is coupled with a satellite electronic communications unit 50. The satellite ECU 50 is for use in a vehicle (not shown), such as a highway tractor or heavy duty truck. The communications unit 50 may be coupled with various apparatus, including a breakdown button 90, an instrument cluster 92, and a stalk 94. As discussed, a more detailed discussion of these components may be found in U.S. Provisional Patent Application Ser. No. 60/332,865, entitled "Integrated Vehicle Communications Display," which is incorporated herein by reference in its entirety.

The third frequency range is shown from about 0 MHz to about 130 MHz. The third frequency range includes a frequency range conventionally used for broadcast AM radio signals having frequencies ranging from about 550 kHz to about 1600 kHz. The third frequency range further includes a frequency range conventionally used for broadcast FM radio signals having frequencies ranging from about 88 MHz to about 108 MHz. As illustrated, certain signals in the third frequency range are passed to a third receiver apparatus 70. The third apparatus is illustrated as a AM/FM commercial radio 70.

The multiplex unit may include circuitry for passing signals of a certain band width directly to an apparatus. The frequency range conventionally used for Citizen Band radio signals has frequencies ranging from about 26.95 MHz to about 27.405 MHz. As illustrated, certain signals that are in the third frequency range are passed to directly to an apparatus 75. The apparatus is illustrated as a CB radio 75. The CB radio may be used by a driver for transmitting and receiving audio messages to and from another CB radio. It should be apparent to others with ordinary skill in the art that other apparatus maybe employed in the practice of the present invention.

In an alternative embodiment, the multiplex unit 30 includes circuitry for passing signals of a band width above the upper limit of 170 MHz. The above limit frequencies may be passed directly to a fourth receiver apparatus 80 as shown, or alternatively, via the satellite ECU 50. As illustrated, the fourth receiver apparatus is a cellular telephone 80. The cellular phone may be used by a driver for transmitting and receiving audio messages to and from another telephone. The signals conventionally used by a cellular phone have a frequency band of about 825 MHz to about 890 MHz.

Referring again to FIG. 1, the antenna system 10 may be utilized in practice in several ways. For exemplary purposes only, a discussion of one use is provided. A fleet office manager may rely upon the system 10 to send massages to a driver. To receive messages from a fleet office, the message is sent from the fleet office over a worldwide web server (not shown) to a satellite system. The satellite sends the message through the air down to the truck's CB antenna 20. The message received by the CB antenna 20 passes through the multiplex box 30 and is filtered to a frequency of 130 to 150 MHz by the filter unit 40. Other signals of varying frequency may be simultaneously passed by the multiplex box 30. These other frequencies are passed by the filter unit 40 to appropriate first or third apparatus.

After the filter unit 40 sends the signal in the second frequency range, the satellite electronic communications unit 50 identifies that a message has been received. The satellite electronic communications unit 50 puts the message in Que. The message is sent to the instrument cluster 92. In the exemplary embodiment, the driver can receive or input data to the satellite via the instrument stalk 94 or breakdown button 90.

The preferred embodiment of the invention has been illustrated and is described in detail. However, the present invention is not to be considered limited to the precise construction disclosed. Various adaptations, modifications and uses of the invention may occur to those skilled in the art to which the invention relates and the intention is to cover hereby all such adaptations, modifications and uses which fall within the spirit or scope of the appended claims.

What is claimed is:

1. A multiple purpose antenna system for installation on a highway truck to receive and transmit signals, the system comprising:
   at least one antenna for mobile communication of electromagnetic frequency signals having multiple band widths;
   a multiplex unit coupled to said at least one antenna having circuitry for simultaneously passing multiple signals of band widths below an upper limit; and
   a filter unit coupled to said multiplex unit for filtering signals received from the multiplex unit into multiple sets of band width ranges, said sets comprising a first frequency range for use by a first receiver apparatus, a second frequency range for use by a second receiver apparatus, and a third frequency range for use by a third receiver apparatus, and said filter unit being included in a receiver apparatus;
   wherein said filter unit is included within a satellite electronic communications unit that is used by a driver for transmitting and receiving messages to a satellite and from a satellite.

2. The multiple purpose antenna system of claim 1 wherein said upper limit is about 170 MHz.

3. The multiple purpose antenna system of claim 1 wherein said filter unit is a notch filter for filtering out signals having a frequency above a notch range and filtering out signals having a frequency below a notch range.

4. The multiple purpose antenna system of claim 3 wherein said notch range is a frequency range from about 130 MHz to about 150 MHz.

5. The multiple purpose antenna system of claim 1 wherein said first frequency range is from about 150 MHz to about 170 MHz.

6. The multiple purpose antenna system of claim 1 wherein said first frequency range includes a frequency range used for weather band radio signals having frequencies ranging from about 150 MHz to about 170 MHz.

7. The multiple purpose antenna system of claim 1 wherein said second frequency range is from about 130 MHz to about 150 MHz.

8. The multiple purpose antenna system of claim 1 wherein said second frequency range includes a frequency range used for satellite communication signals having frequencies ranging from about 130 MHz to about 150 MHz.

9. The multiple purpose antenna system of claim 1 wherein said third frequency range is from about 0 MHz to about 130 MHz.

10. The multiple purpose antenna system of claim 1 wherein said third frequency range includes a frequency range used for broadcast AM radio signals having frequencies ranging from about 550 kHz to about 1600 kHz.

11. The multiple purpose antenna system of claim 1 wherein said third frequency range includes a frequency range used for broadcast FM radio signals having frequencies ranging from about 88 MHz to about 108 MHz.

12. The multiple purpose antenna system of claim 1 wherein said multiplex unit comprises circuitry for passing signals in a frequency range of about 26.95 MHz to about 27.405 MHz directly to a Citizen Band radio.

13. The multiple purpose antenna system of claim 1 wherein said first receiver apparatus is a weather band radio apparatus.

14. The multiple purpose antenna system of claim 1 wherein said second receiver apparatus is a satellite electronics communications apparatus, wherein said satellite electronic communications apparatus is used by a driver for transmitting and receiving messages to a satellite and from a satellite.

15. The multiple purpose antenna system of claim 1 wherein said third receiver apparatus is an AM/FM commercial radio apparatus.

16. The multiple purpose antenna system of claim 1 wherein said third receiver apparatus is a Citizens Band radio apparatus used by a driver for transmitting and receiving audio messages to and from another CB radio.

17. The multiple purpose antenna system of claim 1 wherein said multiplex unit comprises circuitry for passing signals of a band width above said upper limit directly to a fourth receiver apparatus.

18. The multiple purpose antenna system of claim 17 wherein said fourth receiver apparatus is a cellular telephone used by a driver for transmitting and receiving audio messages to and from another telephone.

19. The multiple purpose antenna system of claim 17 wherein said signals of a band width above said upper limit include signals in a frequency band of about 825 MHz to about 890 MHz.

20. A multiple purpose antenna system for installation on a highway truck to receive and transmit signals, the system comprising:
   a) an antenna for mobile communication of electromagnetic frequency signals having multiple band widths;
   b) a multiplex unit coupled to said antenna having circuitry for simultaneously passing multiple signals of band widths below about 170 MHz;
   c) a filter unit coupled to said multiplex unit for filtering signals received from the multiplex unit into multiple sets of band width ranges, said sets comprising:
      i. a first frequency range of about 150 MHz to about 170 MHz for use by a weather band radio:
      ii. a second frequency range of about 130 MHz to about 150 MHz for use by a satellite electronic communications unit;
      iii. a third frequency range of about 0 MHz to about 130 MHz for use by a commercial radio; and
   d) wherein said filter is a notch filter and is included within said satellite electronic communications unit.

* * * * *